US011186272B2

United States Patent
Woo et al.

(10) Patent No.: US 11,186,272 B2
(45) Date of Patent: Nov. 30, 2021

(54) CONTROL METHOD FOR ELECTRONIC LIMITED SLIP DIFFERENTIAL

(71) Applicants: HYUNDAI MOTOR COMPANY, Seoul (KR); KIA MOTORS CORPORATION, Seoul (KR)

(72) Inventors: Seunghoon Woo, Seongnam-si (KR); Min Chan Jung, Hwaseong-si (KR); Jong Hun Song, Seoul (KR); Sang Suk Yang, Suwon-si (KR); Seong Yun Jang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 226 days.

(21) Appl. No.: 16/527,953

(22) Filed: Jul. 31, 2019

(65) Prior Publication Data
US 2020/0324758 A1    Oct. 15, 2020

(30) Foreign Application Priority Data

Apr. 11, 2019 (KR) .................. 10-2019-0042276

(51) Int. Cl.
*B60W 30/04* (2006.01)
*B60W 30/045* (2012.01)

(52) U.S. Cl.
CPC ....... *B60W 30/045* (2013.01); *B60W 2520/28* (2013.01); *B60W 2540/10* (2013.01); *B60W 2540/12* (2013.01); *B60W 2720/14* (2013.01); *B60W 2720/266* (2013.01)

(58) Field of Classification Search
CPC ........... B60W 30/045; B60W 2720/14; B60W 2540/12; B60W 2720/266; B60W 2540/10; B60W 2520/28; B60W 2520/20; B60W 2520/30; B60W 2720/406; B60W 2520/14; B60K 2001/001; B60K 2023/043
See application file for complete search history.

(56) References Cited

U.S. PATENT DOCUMENTS

| 4,966,250 | A | * | 10/1990 | Imaseki | ............. | B60K 23/0808 |
| | | | | | | 180/197 |
| 5,471,390 | A | * | 11/1995 | Sasaki | .................... | B60K 23/04 |
| | | | | | | 303/DIG. 6 |
| 6,491,126 | B1 | * | 12/2002 | Robison | ............. | B60K 17/3462 |
| | | | | | | 180/233 |
| 8,548,706 | B2 | * | 10/2013 | Miura | ..................... | B60T 8/322 |
| | | | | | | 701/69 |

(Continued)

FOREIGN PATENT DOCUMENTS

KR    10-2018-0091329    8/2018

*Primary Examiner* — Mary Cheung
(74) *Attorney, Agent, or Firm* — Lempia Summerfield Katz LLC

(57) ABSTRACT

A control method for an electronic limited slip differential of a vehicle includes: determining by a controller, whether the vehicle is in an understeer state or an oversteer state when the vehicle is turning; and performing driving force movement control by the controller. In particular, when the vehicle is in the understeer state and an actual driving force of an inner wheel of the vehicle is greater than an allowable driving force of inner wheel, the controller increases the control torque of the electronic limited slip differential and transfers the inner wheel driving force to the outer wheel of the vehicle.

11 Claims, 10 Drawing Sheets

(56) References Cited

U.S. PATENT DOCUMENTS

| | | | |
|---|---|---|---|
| 2007/0213913 A1* | 9/2007 | Ushiroda | B60T 8/1755 |
| | | | 701/82 |
| 2008/0059034 A1* | 3/2008 | Lu | B60T 8/17552 |
| | | | 701/71 |
| 2009/0018742 A1* | 1/2009 | Miura | B60W 30/045 |
| | | | 701/72 |
| 2010/0170737 A1* | 7/2010 | Meissner | B60K 23/0808 |
| | | | 180/248 |
| 2010/0203999 A1* | 8/2010 | Yokoo | F16H 48/30 |
| | | | 475/223 |
| 2014/0121929 A1* | 5/2014 | Murofushi | B60W 50/10 |
| | | | 701/70 |
| 2014/0145498 A1* | 5/2014 | Yamakado | B60W 30/02 |
| | | | 303/3 |
| 2018/0201129 A1* | 7/2018 | Coerman | B60W 10/119 |
| 2018/0304917 A1* | 10/2018 | Michelis | B62D 5/0472 |

* cited by examiner

CONTROL METHOD FOR ELECTRONIC LIMITED SLIP DIFFERENTIAL

CROSS REFERENCE TO RELATED APPLICATION

The present application claims priority to and the benefit of Korean Patent Application No. 10-2019-0042276, filed Apr. 11, 2019, the entire contents of which are incorporated herein by reference.

FIELD

The present disclosure relates to a control technique of a vehicle equipped with an electronic limited slip differential.

BACKGROUND

The statements in this section merely provide background information related to the present disclosure and may not constitute prior art.

An electronic limited slip differential can actively and precisely control an amount of relative slip of both drive wheels by an applied electrical signal.

When a vehicle turns, an appropriate differential function is desired to enable the vehicle to turn smoothly. Meanwhile, when the vehicle accelerates during turning, provided driving force is transmitted to a turning outer wheel by limiting a differential by sensing a slip of a turning inner wheel, a turning speed of the vehicle can be improved.

However, we have discovered that when attempting to achieve the above-described effects by performing differential limiting control after sensing the slip of the inner wheel by a sensor at time of acceleration during turning of the vehicle, it is difficult to secure a desired driving performance of the vehicle because, for example, excessive slip occurs due to a delay in actual operation.

It should be understood that the above description of the background arts of the present disclosure is merely for the purpose of promoting an understanding of the background of the present disclosure, and should not be construed as an admission that this is a related art that is already known to those of ordinary skill in the art.

SUMMARY

The present disclosure proposes a control method for an electronic limited slip differential that predicts a slip of an inner wheel at time of acceleration during turning of a vehicle equipped with the electronic limited slip differential so that a preemptive differential limiting action can be exerted and also slip of an outer wheel can be inhibited or prevented. Meanwhile, another form of the present disclosure proposes a control method that is capable of reducing oversteer as well as understeer, thereby greatly improving the turning performance of the vehicle and ultimately improving the commerciality of the vehicle.

In one aspect of the present disclosure, the control method for an electronic limited slip differential of a vehicle may include: determining, by a controller, whether the vehicle is in an understeer state or an oversteer state at a time of turning; and performing driving force movement control by the controller, wherein, when the vehicle is in the understeer state, and an actual driving force of an inner wheel of the vehicle becomes greater than an allowable driving force of the inner wheel, the controller increases a control torque of the electronic limited slip differential and transfers a driving force of the inner wheel to an outer wheel of the vehicle.

While performing the driving force movement control, the controller may further perform wheel slip control, by the controller, performing feedback control of the control torque of the electronic limited slip differential based on a speed difference between the inner and outer wheels and a speed difference between the outer wheel and the vehicle.

The control method may further include performing yaw damping control by the controller, wherein, when the vehicle is in the oversteer state, and a speed of the outer wheel is higher than a speed of the inner wheel, the controller increases the control torque of the electronic limited slip differential based on a yaw error and transfers a driving force of the outer wheel to the inner wheel.

In the driving force movement control, the allowable driving force of the inner wheel may be obtained as in the following equation, $$\text{allowable driving force of the inner wheel} = \sqrt{(\text{limiting frictional force of inner wheel})^2 - (\text{lateral force of inner wheel})^2}.$$

The control torque of the electronic limited slip differential in the driving force movement control may increase in proportion to a degree that the actual driving force supplied to the inner wheel is greater than the allowable driving force of the inner wheel.

In the driving force movement control, the control torque of the electronic limited slip differential may be calculated as:

$$T_{elsd\_WT} = 2(F_{drive}/2 - F_{x\_max\_In})R_{tire},$$

where, $T_{elsd\_WT}$: Control torque of driving force movement control, $F_{drive}$: Driving force supplied to both drive wheels from a power source, $F_{x\_max\_In}$: Allowable driving force of inner wheel, and $R_{tire}$: Dynamic load radius of driving wheel.

When the driving force movement control is performed, the driving force transmitted to the outer wheel from the inner wheel may be limited so that an actual driving force of the outer wheel does not exceed an allowable driving force of the outer wheel.

The wheel slip control may be performed by the feedback control of the control torque of the electronic limited slip differential so as to increase the driving force transmitted from the inner wheel to the outer wheel in proportion to the speed difference between the inner and outer wheels.

The wheel slip control may be performed by the feedback control of the control torque of the electronic limited slip differential so as to reduce the driving force transmitted from the inner wheel to the outer wheel in proportion to the speed difference between the outer wheel and the vehicle.

The yaw damping control may control the control torque of the electronic limited slip differential so that the driving force transmitted from the outer wheel to the inner wheel is increased in proportion to a difference between an actual yaw angular speed and a target yaw angular speed.

The driving force movement control may be configured to be performed only when a driver depresses an accelerator pedal of the vehicle.

The driving force movement control may be configured to be performed in a situation only when a brake of the vehicle is off and not to be performed when the brake is on.

The present disclosure predicts slip of the inner wheel at time of acceleration during turning of the vehicle equipped with the electronic limited slip differential and exerts the preemptive differential limiting action, thereby improving acceleration during turning of the vehicle. In addition, the present disclosure, by preventing slip of the outer wheel, enables a driver to escape a corner through driving of acceleration during turning in a wide open throttle (WOT) state where the driver steps on the accelerator pedal to the maximum and allows understeer and oversteer to be reduced only in the understeer state and the oversteer state, respectively, whereby smooth and stable turning can be realized.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
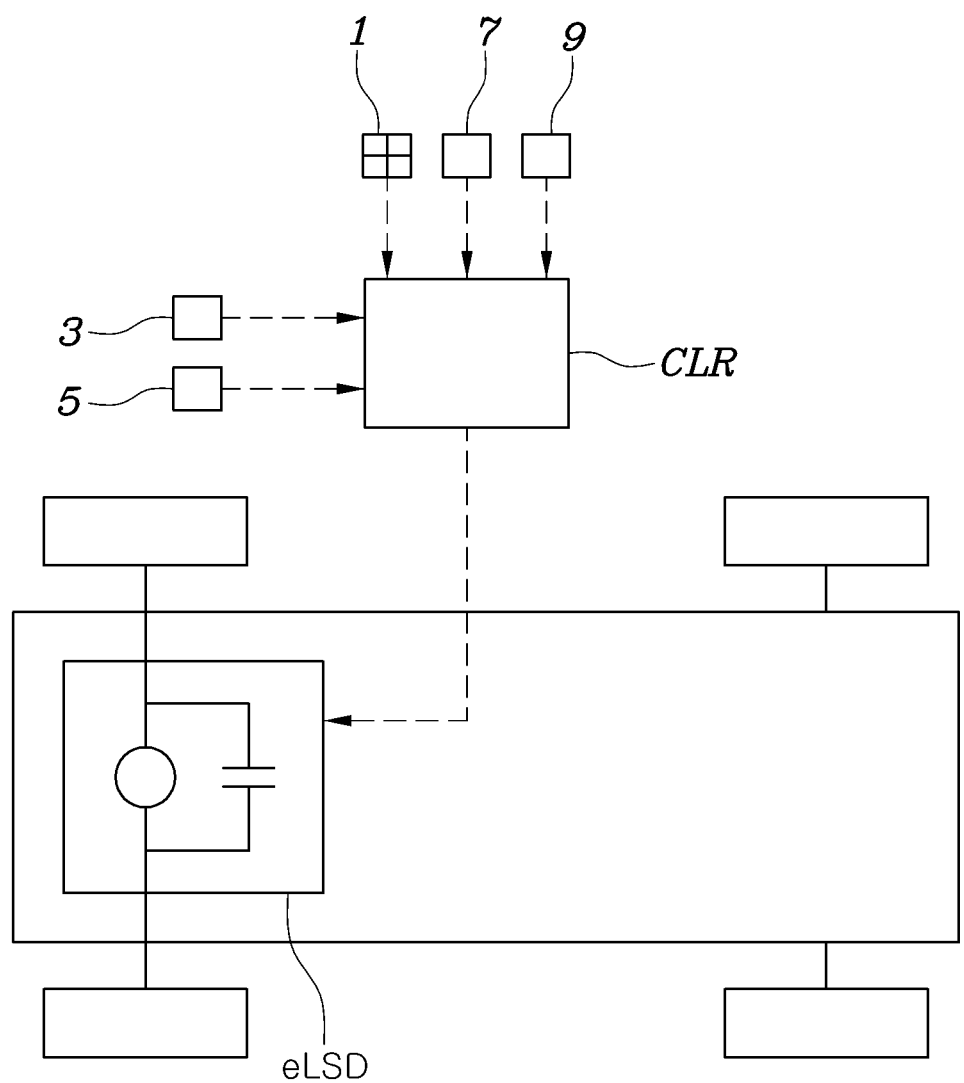
FIG. 1 is a block diagram of a vehicle equipped with an electronic limited slip differential.
Figure 2:
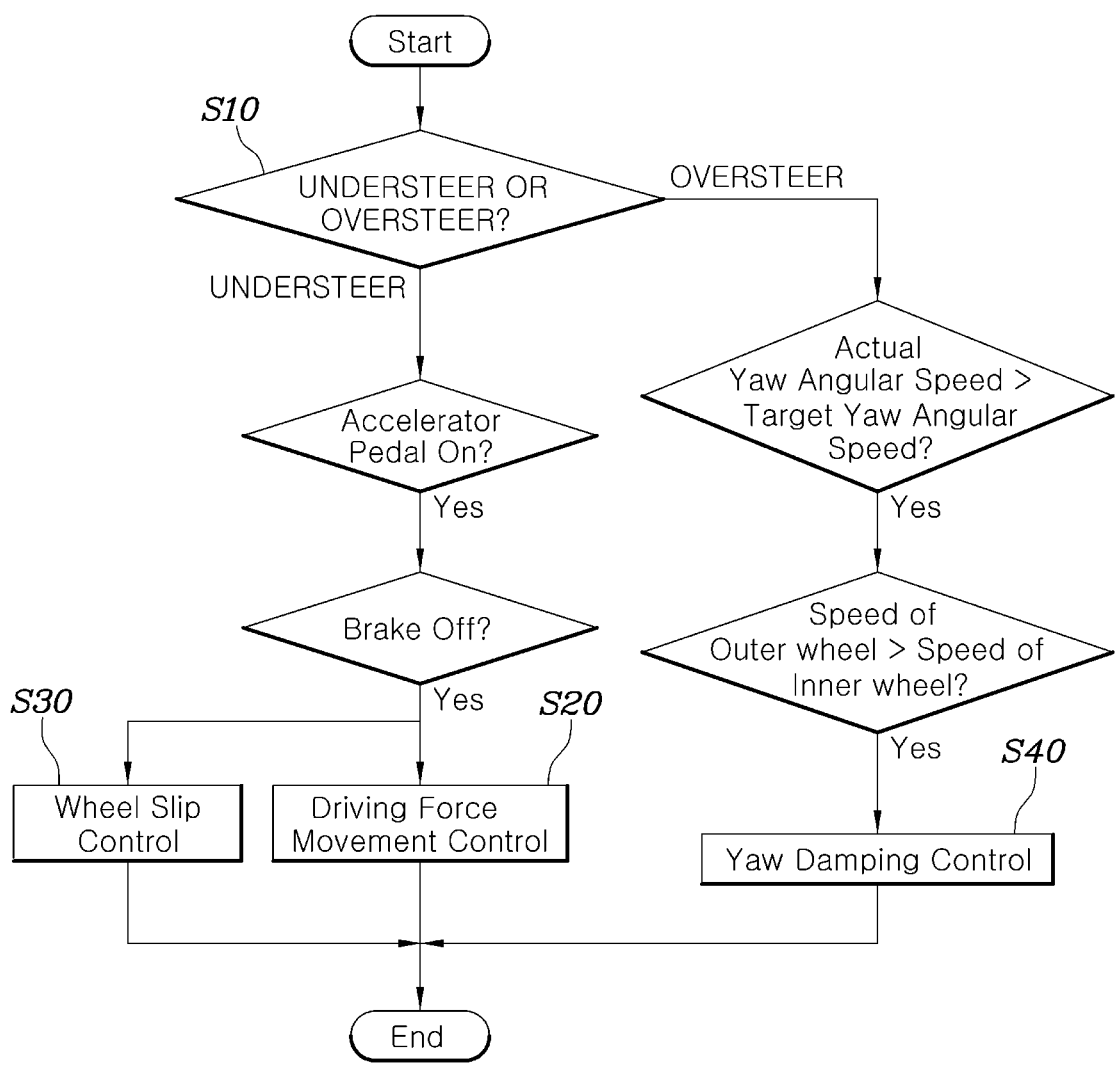
FIG. 2 is a flowchart showing a control method of the electronic limited slip differential.
Figure 3:
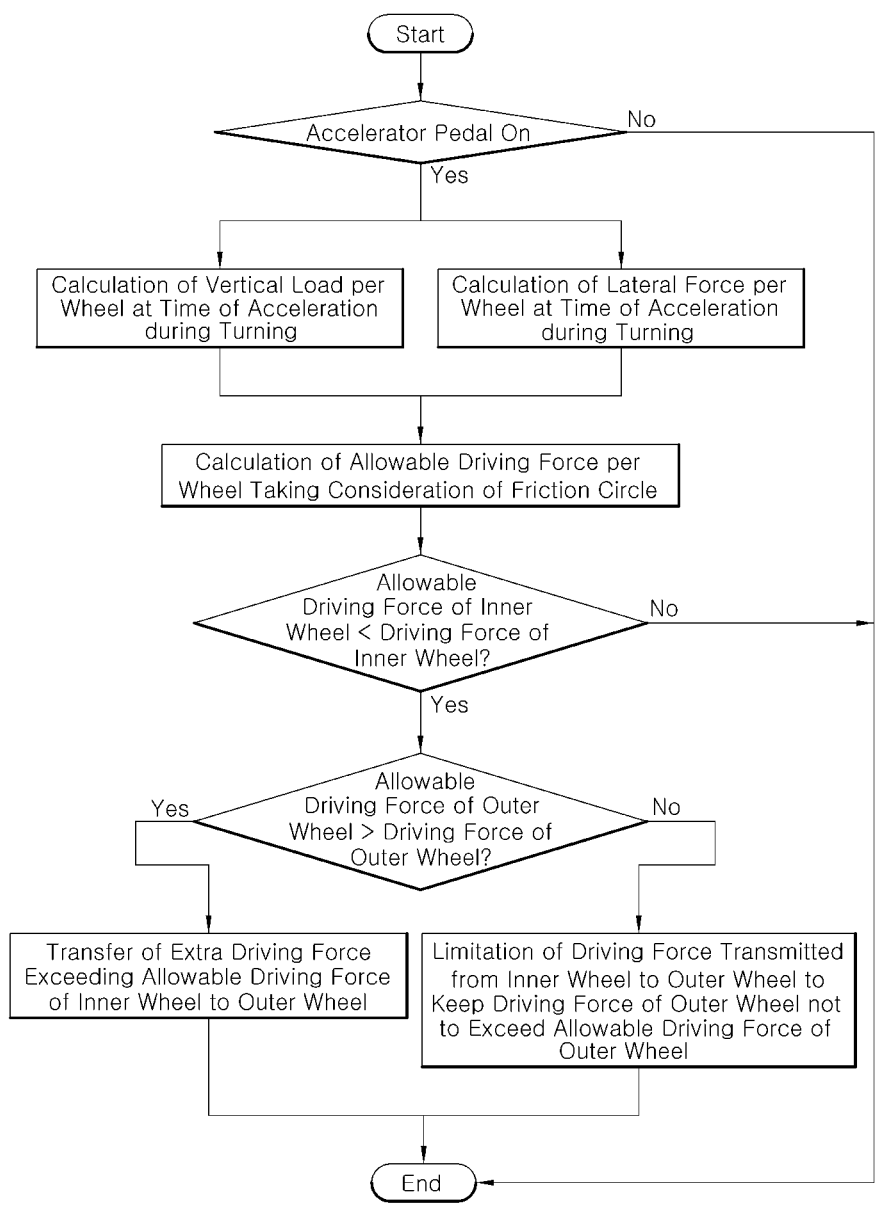
FIG. 3 is a flowchart showing driving force movement control of FIG. 2 in more detail.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a block diagram of a vehicle equipped with an electronic limited slip differential to which the present disclosure is capable of being applied. The vehicle is configured such that an electronic limited slip differential (eLSD) is provided between front driving wheels, wherein the eLSD is provided with a clutch mechanism connecting the two wheels, and a clutch controller (CLR) may adjust control torque, which is the torque transmitted by the clutch mechanism, thereby adjusting an amount of slip of both driving wheels.

The CLR is capable of receiving signals from a wheel speed sensor 1 of each wheel, a steering angle sensor 3, a yaw sensor 5, and the like, and receives information about accelerator pedal operation of a driver from an accelerator position sensor (APS) 7, information about brake operation from a brake pedal position sensor (BPS) 9, and the like, thereby adjusting the control torque of the limited slip differential.

With reference to FIGS. 2 to 5, a control method of an electronic limited slip differential according to one form of the present disclosure includes: step S10 of determining, by a controller, whether the vehicle is in an understeer state or an oversteer state at time of turning; and step S20 of performing the driving force movement control by the controller. In particular, when the vehicle is in the understeer state and actual driving force of an inner wheel becomes greater than an allowable driving force of the inner wheel, the controller increases control torque of the electronic limited slip differential and transfers the driving force of the inner wheel to an outer wheel.

In addition, while performing the driving force movement control, the controller further performs step S30 of the wheel slip control performing feedback control of the control torque of the electronic limited slip differential in accordance with a speed difference between the inner and outer wheels and a speed difference between the outer wheel and the vehicle.

In addition, the present disclosure further includes step S40 of yaw damping control, and when the vehicle is in the oversteer state and the speed of the outer wheel is higher than the speed of the inner wheel, the controller increases the control torque of the electronic limited slip differential in accordance with a yaw error and transfers the driving force of the outer wheel to the inner wheel.

That is, the present disclosure performs understeer control for reducing understeer when the vehicle is in the understeer state at time of turning, wherein the understeer control is implemented with the driving force movement control and the wheel slip control in parallel. Likewise, the present disclosure performs oversteer control for reducing oversteer when the vehicle is in the oversteer state at time of turning, wherein the oversteer steer control is implemented with the yaw damping control.

Figure 6:
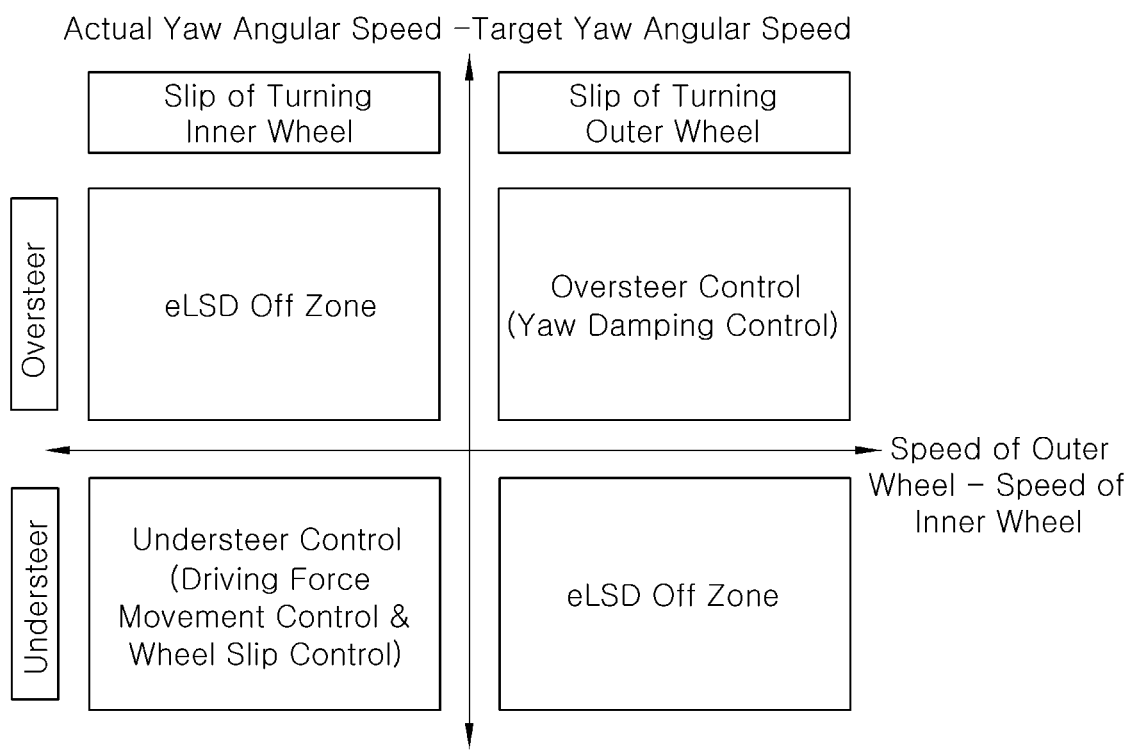
FIG. 6 is a view illustrating application zones in accordance with a difference between actual yaw angular speed and target yaw angular speed and a difference between speed of outer wheel and speed of inner wheel.

With reference to FIG. 6, in an oversteer zone where the actual yaw angular speed is greater than the target yaw angular speed, the oversteer control according to one form of the present disclosure is performed in a state where the speed of the outer wheel is higher than the speed of the inner wheel. Similarly, in an understeer zone where the actual yaw angular speed is less than the target yaw angular speed, the understeer control is performed in a state where the speed of the inner is higher than the speed of the outer wheel due to an occurrence of the slip of the inner wheel.

Figure 7:
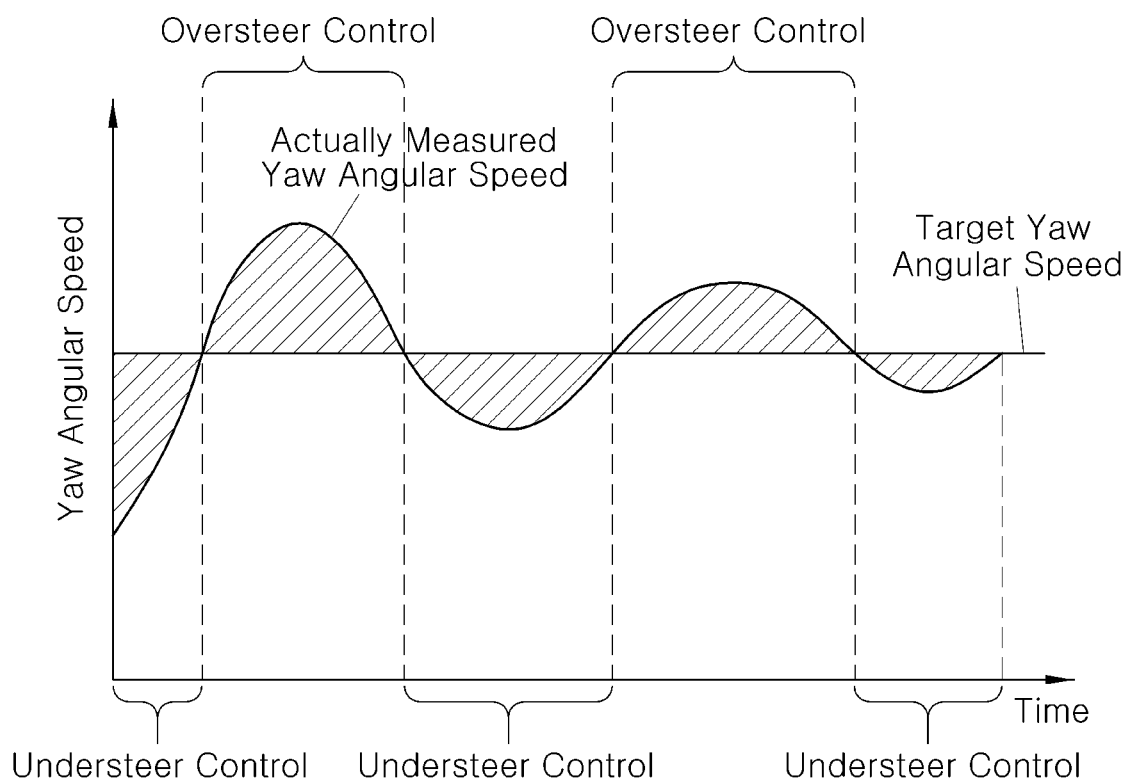
FIG. 7 is a graph illustrating an oversteer control zone and an understeer control zone with respect to a change in a yaw rate.

As shown in a graph of yaw angular speed in FIG. 7, when the actual yaw angular speed measured by the yaw sensor 5 is less than the target yaw angular speed, the vehicle is in the understeer state and the understeer control should be performed, and when the actual yaw angular speed is greater than the target yaw angular speed, the oversteer control should be performed.

Figure 8:
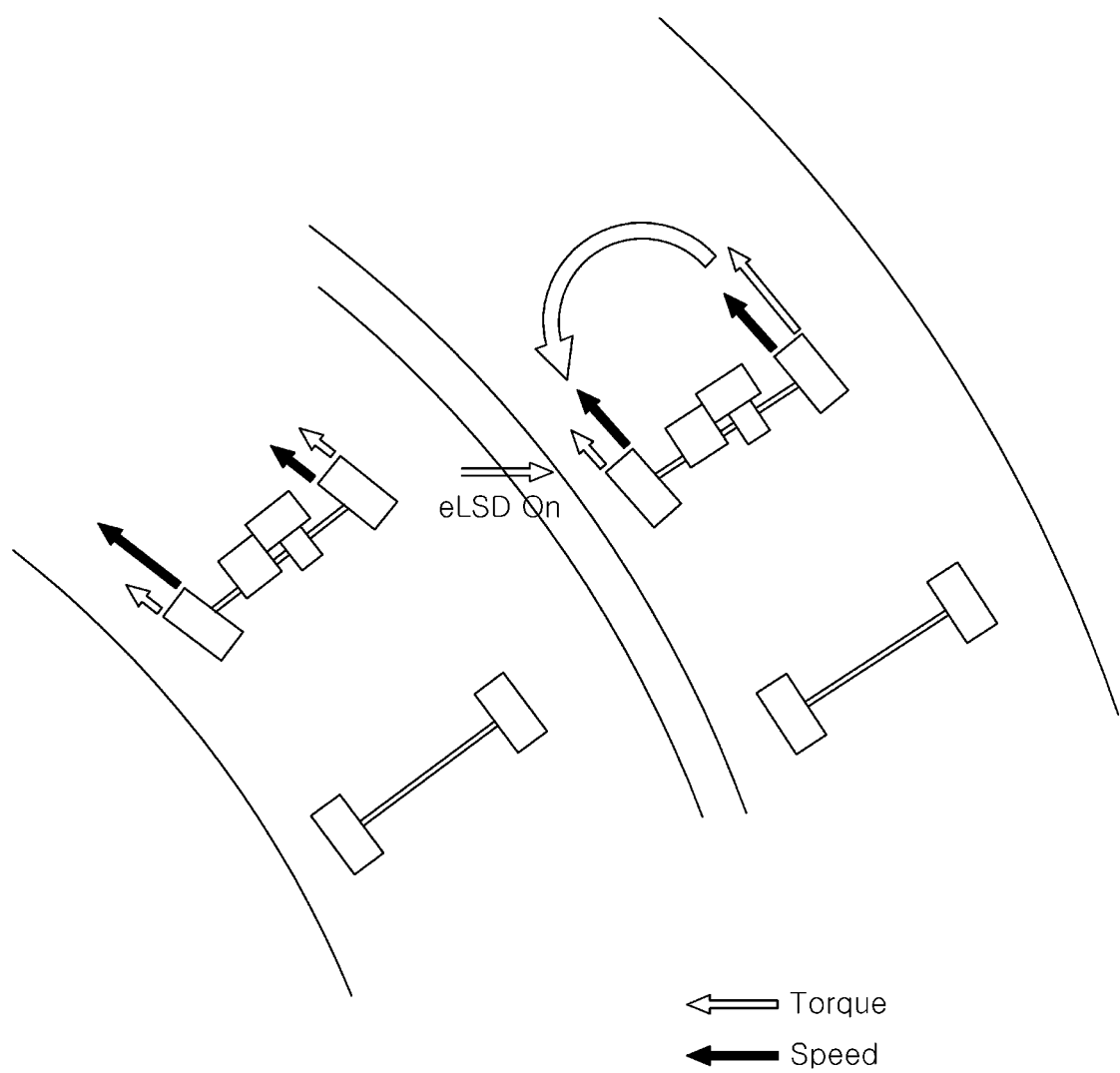
FIG. 8 is a view illustrating a principle of the driving force movement control.

FIG. 8 is a view illustrating the principle of the driving force movement control in one form of the present disclosure.

In general, when the vehicle is turning, the speed of the turning outer wheel is generally higher than the speed of the turning inner wheel due to the difference in turning radius, which is allowed by a differential function.

However, at time of turning of the vehicle, vertical force, which is the force in a direction perpendicular to a road surface, of the turning inner wheel becomes smaller in comparison with the turning outer wheel. This phenomenon occurs because the centrifugal force caused by the turning gives an effect as if the load of the vehicle is shifted toward the turning outer wheel.

When the driver accelerates by depressing the accelerator pedal at time of turning as described above, and the driving force is equally provided from the engine to the turning inner wheel and the turning outer wheel, in the turning inner wheel having a relatively small vertical force with respect to the road surface, slip with respect to the road surface occurs and the speed becomes rather higher than the turning outer wheel, thereby causing the understeer of the vehicle.

When the control torque of the limited slip differential is increased at time of turning as described above to cause the turning inner wheel and the outer wheel to be constrained to each other, braking force is generated at a side having a relatively high speed and driving force is generated at a side having a relatively low speed. Consequently, a driving force movement phenomenon occurs such that a part of the driving force having driven the turning inner wheel moves to be added to the driving force of the turning outer wheel.

Accordingly, as shown in FIG. 8, due to a difference in driving force of the turning outer wheel and the turning inner wheel, a moment is generated in the vehicle such that the vehicle body rotates inward in the turning direction, and as a result, the effect of preventing understeer is exerted.

The driving force movement control is configured to be performed only when the driver depresses the accelerator pedal or in a situation only when the brake is off, and is configured not to be performed in a situation when the brake is on.

As described above, the above-described driving force movement control is performed when the actual driving force of the inner wheel becomes greater than the allowable driving force of the inner wheel. In the driving force movement control, the allowable driving force of the inner wheel is obtained as in the following equation:

allowable driving force of the inner wheel =
$$\sqrt{(\text{limiting frictional force of inner wheel})^2 - (\text{lateral force of inner wheel})^2}.$$

That is, according to the Kamm's friction circle theory, the allowable driving force of the inner wheel is a vector perpendicular to the lateral force of the inner wheel and is limited to the vector within a friction circle that is drawn by the limiting frictional force of the inner wheel, which is the sum of two vectors. For example, when the lateral force of the inner wheel acting on the inner wheel becomes zero, the allowable driving force of the inner wheel becomes equal to the limiting frictional force of the inner wheel, but the present vehicle is in a turning state and the lateral force of the inner wheel is not zero.

The control torque of the electronic limited slip differential in the driving force movement control may be provided to increase in proportion to a degree that the driving force supplied to the inner wheel is greater than the allowable driving force of the inner wheel.

In the driving force movement control, the control torque of the electronic limited slip differential may be calculated, for example, as in the following equation, $$T_{elsd\_WT} = 2(F_{drive}2 - F_{x\_max\_In})R_{tire},$$

where, $T_{elsd\_WT}$: Control torque of driving force movement control, $F_{drive}$: Driving force supplied to both drive wheels from a power source, $F_{x\_max\_In}$: Allowable driving force of inner wheel, and $R_{tire}$: Dynamic load radius of driving wheel.

In addition, when the driving force movement control is performed, the driving force transmitted to an outer wheel from an inner wheel may be limited so that the actual driving force of the outer wheel does not exceed the allowable driving force of the outer wheel.

This is to prevent the outer wheel from being slipped on the road surface by the driving force movement control.

That is, when the control torque of the limited slip differential is increased by the driving force movement control at time of the acceleration during turning, the driving force is moved from the turning inner wheel to the turning outer wheel as described above. The turning outer wheel is capable of exerting a greater driving force because of higher gripping force thereof. By the turning outer wheel exerting such greater driving force, as the yaw moment is applied to the vehicle in a direction of reducing understeer, the driving force of the vehicle is also increased so that an escape acceleration at the turning corner may be increased.

However, when the turning outer wheel also slips for the road surface during the above-described control, understeer rather increases and the acceleration force of the vehicle also rather decreases. To prevent this, it is desired to limit the driving force that moves from the turning inner wheel toward the turning outer wheel.

As a method of restricting the driving force that moves from the turning inner wheel to the turning outer wheel as described above, the control torque of the driving force movement control within the range of the equation such as $T_{elsd\_WT} < (F_{x\_max\_Out} - F_{x\_max\_In})/R_{tire}$ may be used.

That is, the control torque $T_{elsd\_WT}$ of the driving force control is kept smaller than the torque obtained by multiplying the difference between the allowable driving force of outer wheel $F_{x\_max\_Out}$ and the allowable driving force of the inner wheel $F_{x\_max\_In}$ by the tire dynamic load radius $R_{tire}$.

Figure 4:
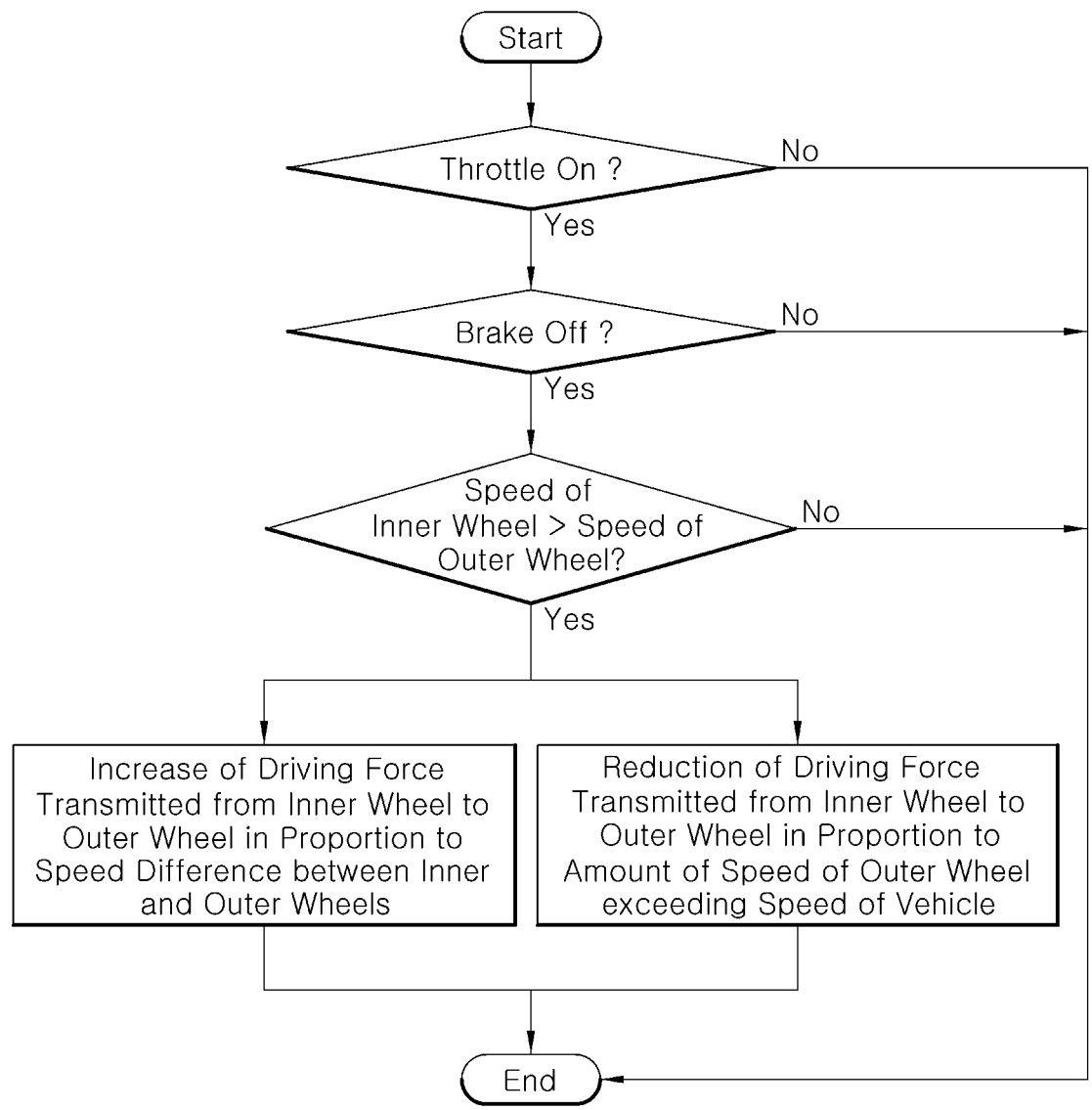
FIG. 4 is a flowchart showing wheel slip control of FIG. 2 in more detail.

Meanwhile, with reference to FIG. 4, the wheel slip control is performed by the feedback control of the control torque of the electronic limited slip differential so as to increase the driving force transmitted from the inner wheel to the outer wheel in proportion to the speed difference between the inner and outer wheels. In addition, the wheel slip control is performed by the feedback control of the control torque of the electronic limited slip differential so as to reduce the driving force transmitted from the inner wheel to the outer wheel in proportion to the speed difference between the outer wheel and the vehicle.

Here, when the speed difference between the inner wheel and the outer wheel occurs, the control torque of the wheel slip control may be calculated by an equation such as $T_{elsd\_WS}$=Gain 1 (speed of inner wheel–speed of outer wheel–Offset 1).

Here, it may be possible to provide the wheel slip control to calculate the control torque of the wheel slip control more suitable for the corresponding vehicle by appropriately adjusting the Gain 1 and the Offset 1.

In addition, when the speed difference between the outer wheel and the vehicle occurs, the control torque of the wheel slip control, with an equation such as $T_{elsd\_WS} = T_{elsd\_WS} -$ Gain 2 (speed of outer wheel−speed of vehicle−Offset 2), may be updated to a new control torque. Here, the new control torque is obtained by subtracting certain control torque from the control torque $T_{elsd\_WS}$ according to the generation of the speed difference between the outer wheel and inner wheel, wherein the certain control torque is obtained by multiplying the Gain 2 to an amount that is obtained by subtracting the Offset 2 from the speed difference between the outer wheel and the vehicle.

The Gain 2 and Offset 2 may be set each to appropriate values taking into consideration of the characteristics of the corresponding vehicle.

This wheel slip control is the feedback control for increasing the robustness of the driving force movement control by being performed in parallel with the driving force movement control which is a feedforward control. Fundamentally, the wheel slip allows the driving force to move from the turning inner wheel to the turning outer wheel, and, when the speed of the turning outer wheel becomes larger than the speed of the vehicle, whereby the slip of the turning outer wheel occurs, allows the driving force transmitted from the turning inner wheel to the turning outer wheel is reduced in proportion to the amount of the slip.

Figure 9:
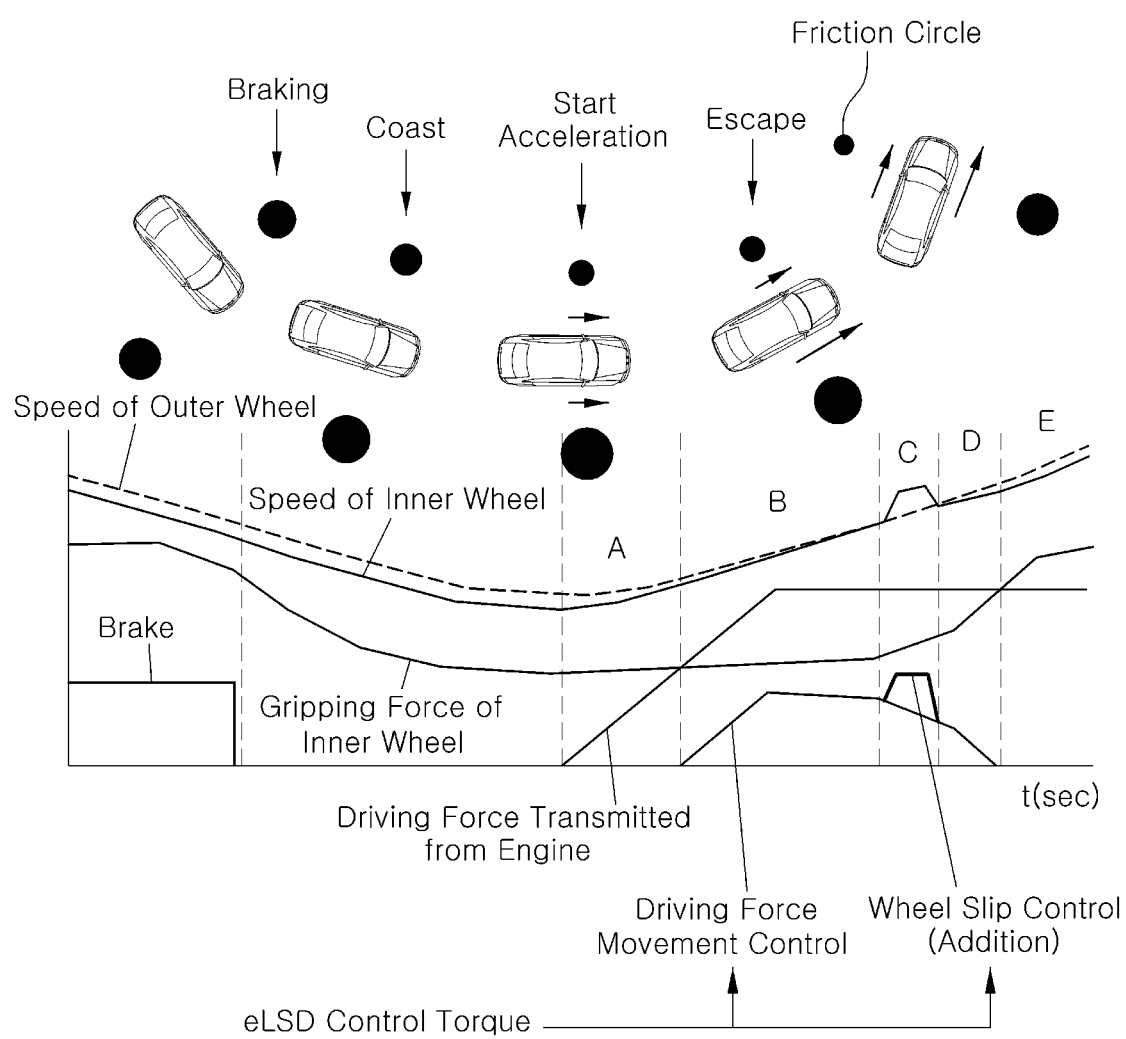
FIG. 9 is a view illustrating understeer control, thereby illustrating the driving force movement control and the wheel slip control.

FIG. 9 is a view illustrating the understeer control in another form of the present disclosure, thereby illustrating the driving force movement control and the wheel slip control. When the vehicle is turning while moving from left to right, the driver starts to accelerate by depressing the accelerator pedal as in a section A. When the driving force provided from an engine starts to exceed gripping force of the inner wheel, the driving force movement control is performed as in a section B. When the speed of the inner wheel becomes higher than the speed of the outer wheel during the driving force movement control is performed as in a section C, the wheel slip control is performed. When a state in which the speed of the inner wheel is higher than the speed of the outer wheel is settled as in a section D, the wheel slip control is released. When the gripping force of the turning inner wheel becomes greater than the driving force provided to the turning inner wheel from the engine, the driving force movement control is also terminated.

Meanwhile, as the oversteer control, the yaw damping control controls the control torque of the electronic limited slip differential so that the driving force transmitted from the outer wheel to the inner wheel is increased in proportion to the difference between the actual yaw angular speed and the target yaw angular speed.

Figure 10:
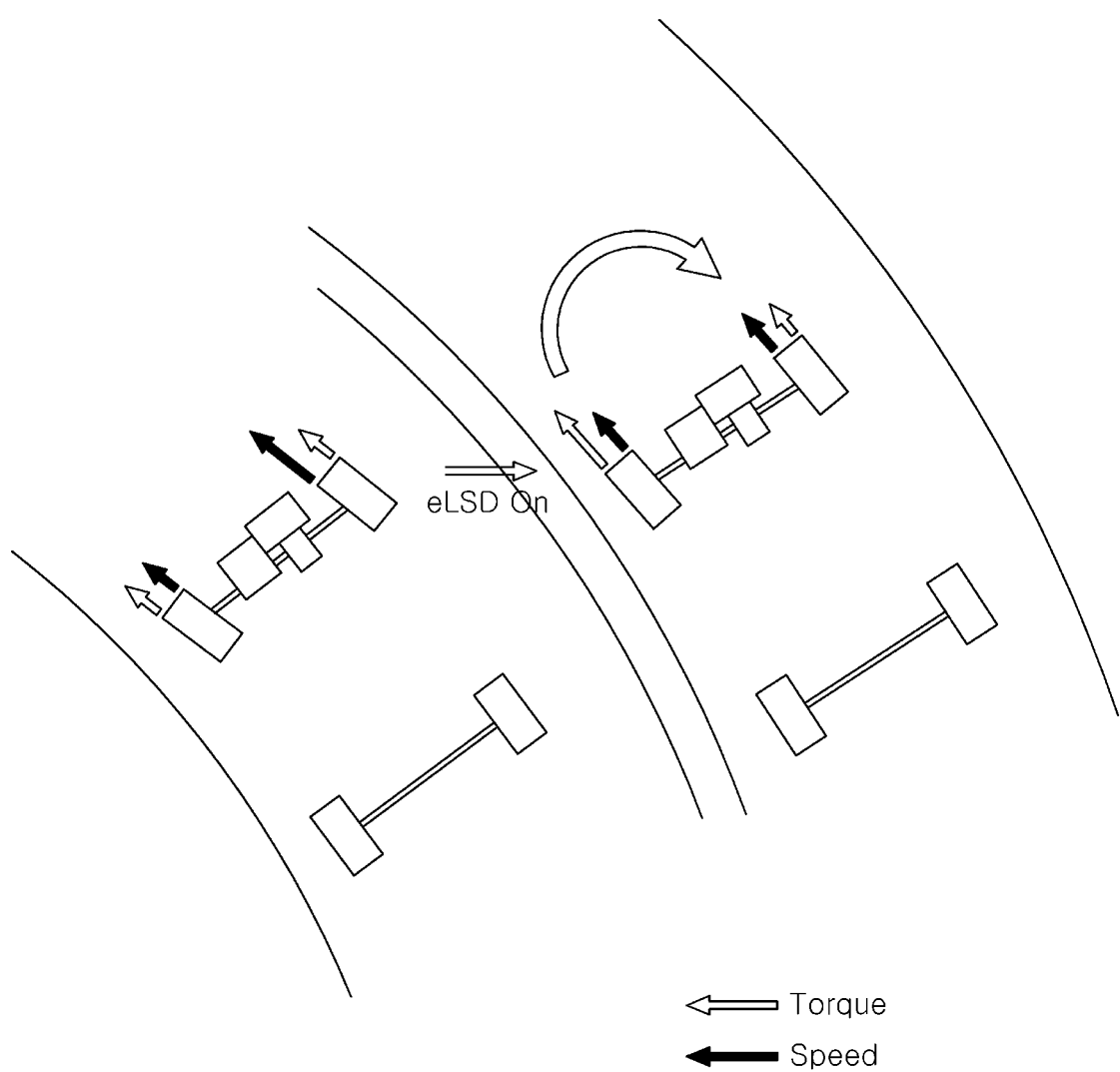
FIG. 10 is a view illustrating oversteer control, thereby illustrating the principle of the yaw damping control.

FIG. 10 is a view illustrating the oversteer control in one form of the present disclosure, thereby illustrating the principle of the yaw damping control.

When the control torque of the limited slip differential is increased to restrain the turning inner wheel and the turning outer wheel in a grip turning state where both of the inner and outer wheels of the vehicle are turning without slippage with respect to the road surface, the speed of the turning outer wheel that has rotated relatively faster decreases, and, on the contrary, the speed of the turning inner wheel that has rotated relatively slower increases. As a result, the driving force of the turning inner wheel increases, thereby inducing the yaw moment to be applied to the vehicle in a direction of reducing the oversteer resulting in preventing the oversteer as illustrated in FIG. 10.

Figure 5:
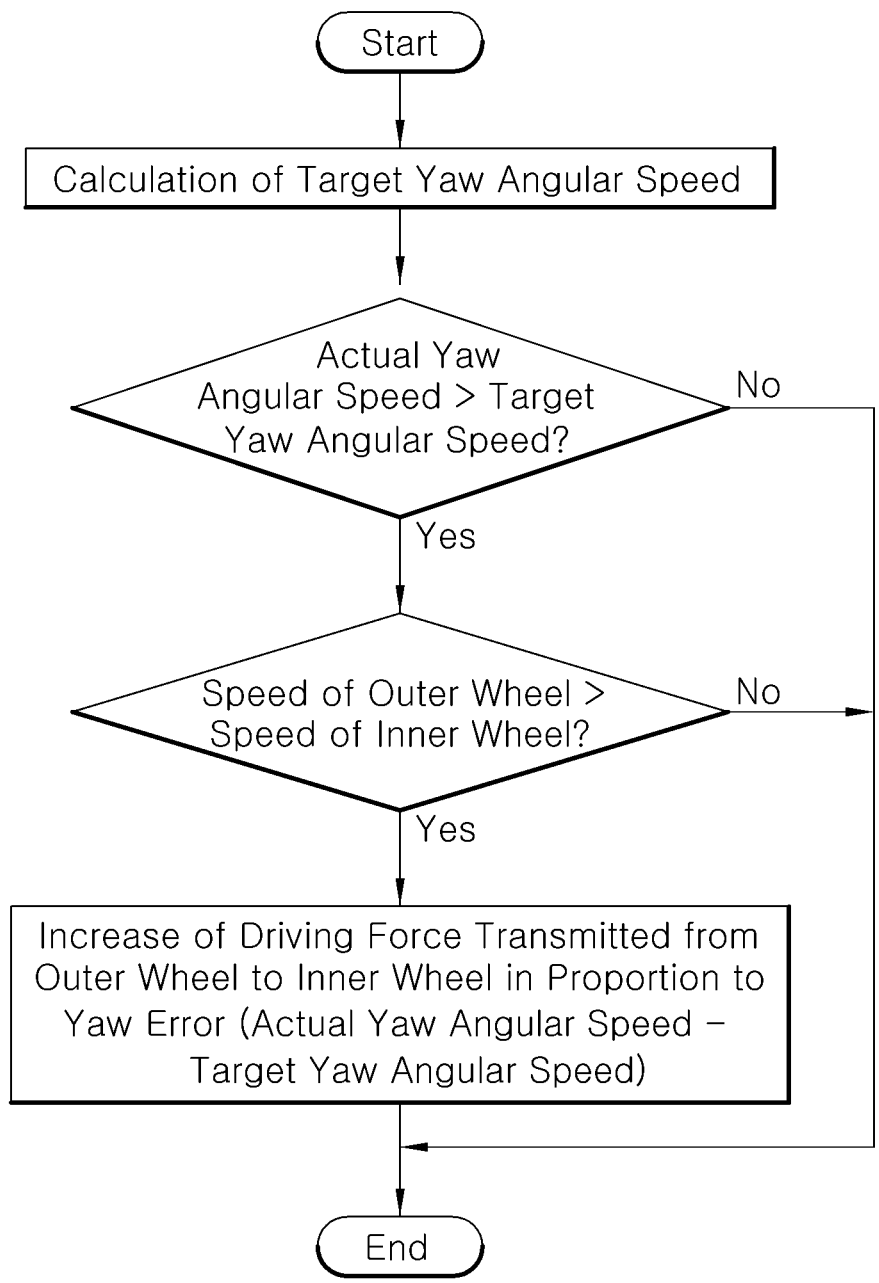
FIG. 5 is a flowchart showing yaw damping control of FIG. 2 in more detail.

As described above, only in the case that the speed of the outer wheel is higher than the speed of the inner wheel, the yaw moment in the direction of reducing the oversteer is generated by the above-described differential limiting function, and, however, the yaw moment generated in the opposite case increases the oversteer. Accordingly, the yaw damping control should be necessarily performed only when the speed of the turning outer wheel is higher than the speed of the turning inner wheel as shown in FIG. 5.

While the present disclosure has been particularly shown and described with reference to specific forms thereof, it will be apparently understood by those of ordinary skill in the art that various changes in form and details may be made therein without departing from the spirit and scope of the present disclosure.

What is claimed is:

1. A control method for an electronic limited slip differential of a vehicle, the control method comprising:
    determining, by a controller, whether the vehicle is in an understeer state or an oversteer state at a time of turning;
    performing driving force movement control by the controller, wherein, when the vehicle is in the understeer state and an actual driving force of an inner wheel of the vehicle becomes greater than an allowable driving force of the inner wheel, the controller is configured to increase a control torque of the electronic limited slip differential and to transfer a driving force of the inner wheel to an outer wheel of the vehicle; and
    performing yaw damping control by the controller, wherein, when the vehicle is in the oversteer state, and a speed of the outer wheel is higher than a speed of the inner wheel, the controller is configured to increase the control torque of the electronic limited slip differential based on a yaw error and to transfer a driving force of the outer wheel to the inner wheel.

2. The control method of claim 1, wherein, while performing the driving force movement control, the controller is configured to perform a wheel slip control performing a feedback control of the control torque of the electronic limited slip differential based on a speed difference between the inner and outer wheels and a speed difference between the outer wheel and the vehicle.

3. The control method of claim 2, wherein the wheel slip control is performed by the feedback control of the control torque of the electronic limited slip differential so as to increase the driving force transmitted from the inner wheel to the outer wheel in proportion to the speed difference between the inner and outer wheels.

4. The control method of claim 2, wherein the wheel slip control is performed by the feedback control of the control torque of the electronic limited slip differential so as to reduce the driving force transmitted from the inner wheel to the outer wheel in proportion to the speed difference between the outer wheel and the vehicle.

5. The control method of claim 1, wherein, in the driving force movement control, the allowable driving force of the inner wheel is calculated as:

$$\text{allowable driving force of the inner wheel} = \sqrt{(\text{limiting frictional force of inner wheel})^2 - (\text{lateral force of inner wheel})^2}.$$

6. The control method of claim 1, wherein the control torque of the electronic limited slip differential in the driving force movement control increases in proportion to a degree that the actual driving force supplied to the inner wheel is greater than the allowable driving force of the inner wheel.

7. The control method of claim 1, wherein, in the driving force movement control, the control torque of the electronic limited slip differential is calculated as:

$$T_{elsd\_WT}=2(F_{drive}/2-F_{x\_max\_In})R_{tire},$$

where, $T_{elsd\_WT}$: Control torque of driving force movement control, $F_{drive}$: Driving force supplied to both drive wheels from a power source, $F_{x\_max\_In}$: Allowable driving force of inner wheel, and $R_{tire}$: Dynamic load radius of driving wheel.

8. The control method of claim 1, wherein, when the driving force movement control is performed, the driving force transmitted to the outer wheel from the inner wheel is limited so that an actual driving force of the outer wheel does not exceed an allowable driving force of the outer wheel.

9. The control method of claim 1, wherein the yaw damping control controls the control torque of the electronic limited slip differential so that the driving force transmitted from the outer wheel to the inner wheel is increased in proportion to a difference between an actual yaw angular speed and a target yaw angular speed.

10. The control method of claim 1, wherein the driving force movement control is configured to be performed only when a driver depresses an accelerator pedal of the vehicle.

11. The control method of claim 1, wherein the driving force movement control is configured to be performed only when a brake of the vehicle is off and not to be performed when the brake is on.

\* \* \* \* \*